(12) United States Patent
Yurth et al.

(10) Patent No.: US 10,299,364 B2
(45) Date of Patent: May 21, 2019

(54) EMITTER FOR DISSOCIATING GAS MOLECULES USING NON-LINEAR QUANTUM DISSONANCE

(71) Applicant: Nova Institute of Technology, INC., Draper, UT (US)

(72) Inventors: David Yurth, Salt Lake City, UT (US); Kevin Collier, Kaysville, UT (US); Michael Kralik, Sandy, UT (US); Colin Wonfor, London (GB)

(73) Assignee: Nova Institute of Technology, Inc., Draper, UT (US)

( * ) Notice: Subject to any disclaimer, the term of this patent is extended or adjusted under 35 U.S.C. 154(b) by 0 days.

(21) Appl. No.: 15/807,304

(22) Filed: Nov. 8, 2017

(65) Prior Publication Data

US 2018/0132341 A1    May 10, 2018

Related U.S. Application Data

(60) Provisional application No. 62/419,323, filed on Nov. 8, 2016.

(51) Int. Cl.
| | |
|---|---|
| *F01N 1/00* | (2006.01) |
| *F01N 3/01* | (2006.01) |
| *F01N 3/08* | (2006.01) |
| *H05H 1/48* | (2006.01) |
| *B01D 53/32* | (2006.01) |
| *B01D 53/56* | (2006.01) |
| *B01D 53/62* | (2006.01) |
| *B01D 53/92* | (2006.01) |

(52) U.S. Cl.
CPC ............... *H05H 1/48* (2013.01); *B01D 53/32* (2013.01); *B01D 53/323* (2013.01); *B01D 53/56* (2013.01); *B01D 53/62* (2013.01); *B01D 53/92* (2013.01); *B01D 53/925* (2013.01); *F01N 3/01* (2013.01); *F01N 3/0892* (2013.01); *B01D 2257/404* (2013.01); *B01D 2257/502* (2013.01); *B01D 2258/01* (2013.01); *B01D 2259/818* (2013.01); *F01N 1/00* (2013.01); *F01N 2240/28* (2013.01)

(58) Field of Classification Search
CPC .......... H05H 1/48; B01D 53/62; B01D 53/92; B01D 53/56; B01D 53/32; B01D 2259/818; F01N 3/01; H01J 13/04; H01J 13/20; H01J 13/56; H01J 21/10; H01J 61/04; H01J 2893/0001
See application file for complete search history.

(56) References Cited

U.S. PATENT DOCUMENTS

| | | | | |
|---|---|---|---|---|
| 4,912,731 A | * | 3/1990 | Nardi | ........................ H05H 1/52 313/231.41 |
| 5,075,522 A | * | 12/1991 | Nardi | ........................ H05H 1/52 218/43 |
| 2003/0155252 A1 | * | 8/2003 | Juda | ..................... B01D 53/228 205/354 |

(Continued)

*Primary Examiner* — Joseph L Williams
*Assistant Examiner* — Jose M Diaz

(57) ABSTRACT

This disclosure relates generally to an emitter for dissociating exhaust gases on a molecular level into their respective elemental constituents. The emitter includes a palladium plated anode and a cathode, at least a portion of which is palladium plated. When properly powered, the emitters create a non-linear quantum dissonance field to dissociate molecules in exhaust.

17 Claims, 6 Drawing Sheets

(56) References Cited

U.S. PATENT DOCUMENTS

| | | | |
|---|---|---|---|
| 2007/0082125 A1* | 4/2007 | Aoyama | H01M 4/881 427/115 |
| 2007/0128484 A1* | 6/2007 | Ogino | H01M 4/94 429/411 |
| 2007/0201598 A1* | 8/2007 | Lerner | G21B 3/00 376/107 |
| 2009/0173623 A1* | 7/2009 | Kato | F01N 3/01 204/270 |
| 2014/0080927 A1* | 3/2014 | Beckett | C25B 1/10 518/704 |
| 2014/0275999 A1* | 9/2014 | Speeg | A61B 10/0266 600/424 |
| 2016/0290223 A1* | 10/2016 | Mills | C01B 3/00 |
| 2017/0077840 A1* | 3/2017 | Grigorenko | H05H 1/48 |
| 2018/0200535 A1* | 7/2018 | Froehlich | A61N 5/1067 |

* cited by examiner

EMITTER FOR DISSOCIATING GAS MOLECULES USING NON-LINEAR QUANTUM DISSONANCE

PRIORITY CLAIM

This application claims priority to U.S. Provisional Patent Application No. 62/419,323 filed on Nov. 8, 2016, which is herein incorporated by reference in its entirety.

BACKGROUND

1. Technical Field

This disclosure relates generally to an emitter device for dissociating gas molecules in a non-linear quantum environment. More specifically, the emitter device may be specifically positioned within an emitter manifold to create a fragmentation field for gaseous molecules. As a flow of gaseous molecules is passed through the fragmentation field, the gaseous molecules are dissociated into their constituent elemental components.

2. Description of the Related Art

Since the Industrial Revolution, and the advent of the use of chemical based fuels, man has been emitting substantial combustion gases into the Earth's atmosphere. More recently, concern has grown over the effects of these emissions on the people and the biosphere of the Earth. Many countries, including the United States, have imposed limits on the quantity of emissions of combustion gases that may be emitted by certain vehicles, factories, power plants, and a host of other emissions sources or required certain exhaust remediation equipment be installed in those emissions sources.

One example of a legally mandated exhaust remediation device is a catalytic converter which is now required equipment for all new cars, light trucks, heavy trucks, and other vehicles. Catalytic converters use a redox reaction (an oxidation and reduction reaction) to chemically change certain toxic gases into less toxic gases. Further, some catalytic converters may recycle emitted but unburned hydrocarbons back to an engine to be burned, to increase fuel efficiency and reduce emissions. Catalytic converters are intended to reduce emissions of carbon monoxide, and oxides of nitrogen (NOx) that are emitted as the result of combustion.

One weakness of catalytic converters is that they are not fully efficient. While catalytic converters are better than nothing at remediating emissions, catalytic converters still allow some undesirable and harmful gases to be emitted from vehicles. Catalytic converters also wear out over time and become less efficient at conducting redox reactions in the catalytic converter. Such decreased efficiency can trigger other vehicular systems to notify a vehicle owner that the emissions system of the vehicle is compromised and require expensive repair.

Other techniques used to prevent undesirable or harmful gases from being emitted into the Earth's atmosphere have been developed as well. For example, various filters have been implemented to filter undesirable or harmful gases from exhaust streams. Other times, exhaust from smokestacks, for example, is burned at the top of the smokestack to burn off volatile compounds left in exhaust (which itself produces undesirable and harmful emissions, albeit less undesirable and less harmful emissions than emitting the original volatile compounds left in the exhaust). Such techniques are common in the oil and gas industry as well as coal fired power plants.

None of these techniques are as effective as is desirable. Filters wear out and require constant maintenance. Filters also resist exhaust flow and can lead to limitations on how much fuel can be burned, which in the case of a coal fired power plant, for example, limits an amount of power available to the population. Further, as noted above, occasionally a solution to an emissions problem frequently results in undesirable and harmful gases being emitted into the atmosphere, albeit less undesirable and less harmful than if no solution was implemented.

While no system is perfectly efficient, it is desirable to remediate emissions in an efficient and cost effective manner. It is therefore one object of this disclosure to provide an emitter that generates a plasma field in a non-linear quantum dissonance environment that dissociates molecules in emitted gases into their various elemental components. It is another object of this disclosure to provide an emitter manifold that positions the emitters in a configuration that maximizes the efficiency of the molecular dissociation within the emitter manifold. Finally, it is an object of this disclosure to implement the emitter manifold in various emissions systems to remediate exhaust.

SUMMARY

Disclosed herein is an emitter. The emitter includes an anode which may be plated with, for example, palladium. The emitter further includes a cathode, at least a portion of which is, for example, palladium plated.

Also disclosed herein is device which includes one or more emitters. Each of the emitters include a palladium plated anode, for example, and a cathode, at least a portion of which is, for example, palladium plated. The one or more emitters may be disposed in an emitter manifold to create a non-linear quantum dissonance field within the emitter manifold.

BRIEF DESCRIPTION OF THE DRAWINGS

The accompanying drawings illustrate embodiments of an emitter for dissociating gas molecules using non-linear quantum dissonance.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the subject matter disclosed herein. While the techniques and embodiments will primarily be described in context with the accompanying drawings, those skilled in the art will further appreciate the techniques and embodiments may also be practiced in other similar apparatuses.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
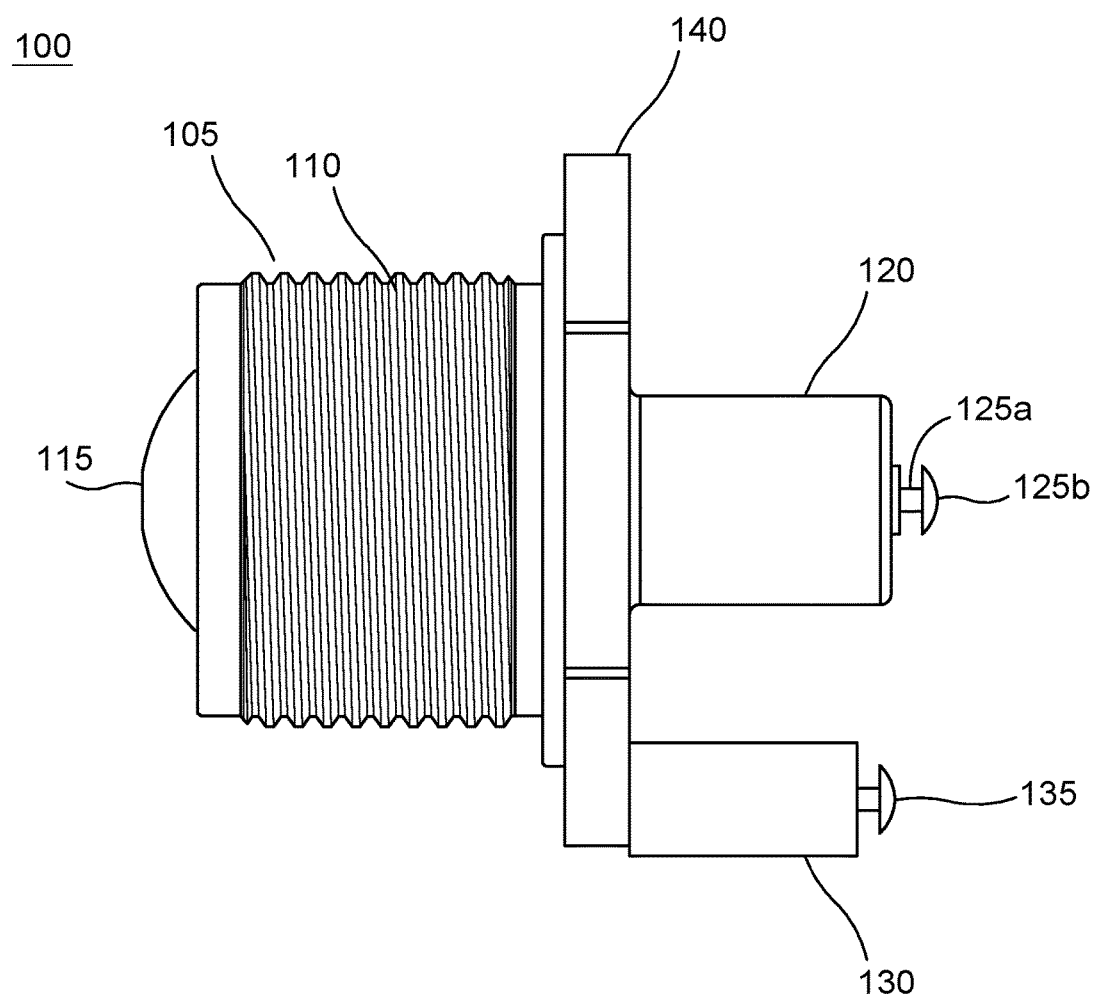
FIG. 1 illustrates a side view of an emitter.

FIG. 1 illustrates an emitter 100. Emitter 100 includes an emitter body 105 which is threaded with helical threads disposed on an outside of emitter body 105. Emitter body 105 may be fashioned from metal materials that are electrically conductive. For example, emitter body 105 may be fashioned from copper, steel, aluminum, gold, or any other conductive metal, metal alloy, ceramic, or polymer, etc. Emitter 100 includes an anode 115 which is implemented in a hemispherical shape. Other implementations of anode 115 are possible. For example, anode 115 may be implemented in other shapes, circular, spherical, spheroidal, rectangular, or any other polygonal shape. Preferably, anode 115 is implemented as generally hemispherical but need not be perfectly hemispherical. That is to say, anode 115 may be arcuate in three dimensions, having a radius of a spheroid, as opposed to the radius of a perfect sphere. A relative curvature of a hemisphere of anode 115 may vary according to a specific implementation of emitter 100.

Emitter 115 may be disposed within an insulator 120 by attachment to a conductor rod 125a, which extends through emitter body 105 to anode 115. Insulator 120 may be fashioned from any material that resists a flow of electricity. For example, insulator 120 may be fashioned using materials such as rubber, ceramic, plastic, or other insulative materials. Conductor rod 125a may be fashioned using any electrically conductive material. For example, conductor rod 125a may be fashioned using various metals such as gold, copper, steel, aluminum, silver, and other highly conductive metals, metal alloys, ceramics, or polymers, etc. Conductor rod 125a may include a conductor rod connector 125b, which may be connected to a power supply which energizes conductor rod 125a and supplies electricity to anode 115, which is also electrically connected to conductor rod 125a.

Emitter body 105 may further be connected to cathode 130. Cathode 130 may include a connector 135 which may be connected to a power supply to provide an electrical path for electricity generated by the power supply. Anode 115 and cathode 130 may be electrically isolated from each other by insulator 120. As anode 115 is powered via electricity provided to conductor rod 125a, and cathode 135 provides a return path for electricity generated by the power supply, a plasma field may be generated between anode 115 and emitter body 105 (which is electrically connected to cathode 115). This plasma field may be adjusted by the characteristics of the electricity provided by the power supply to the emitter, as will be discussed below. Emitter 100 may be used singly or in conjunction with a plurality of other emitters, as will be discussed below, and may include a wrenching surface 140 which provides a surface for emitter 100 to be inserted into an emitter manifold, which will be discussed in more detail below. Wrenching surface 140 may be octagonally shaped, hexagonally shaped, square shaped, or shaped using any polygonal shape which provides a surface for a tool to thread emitter 100, via threads 110, into an emitter body.

Figure 2:
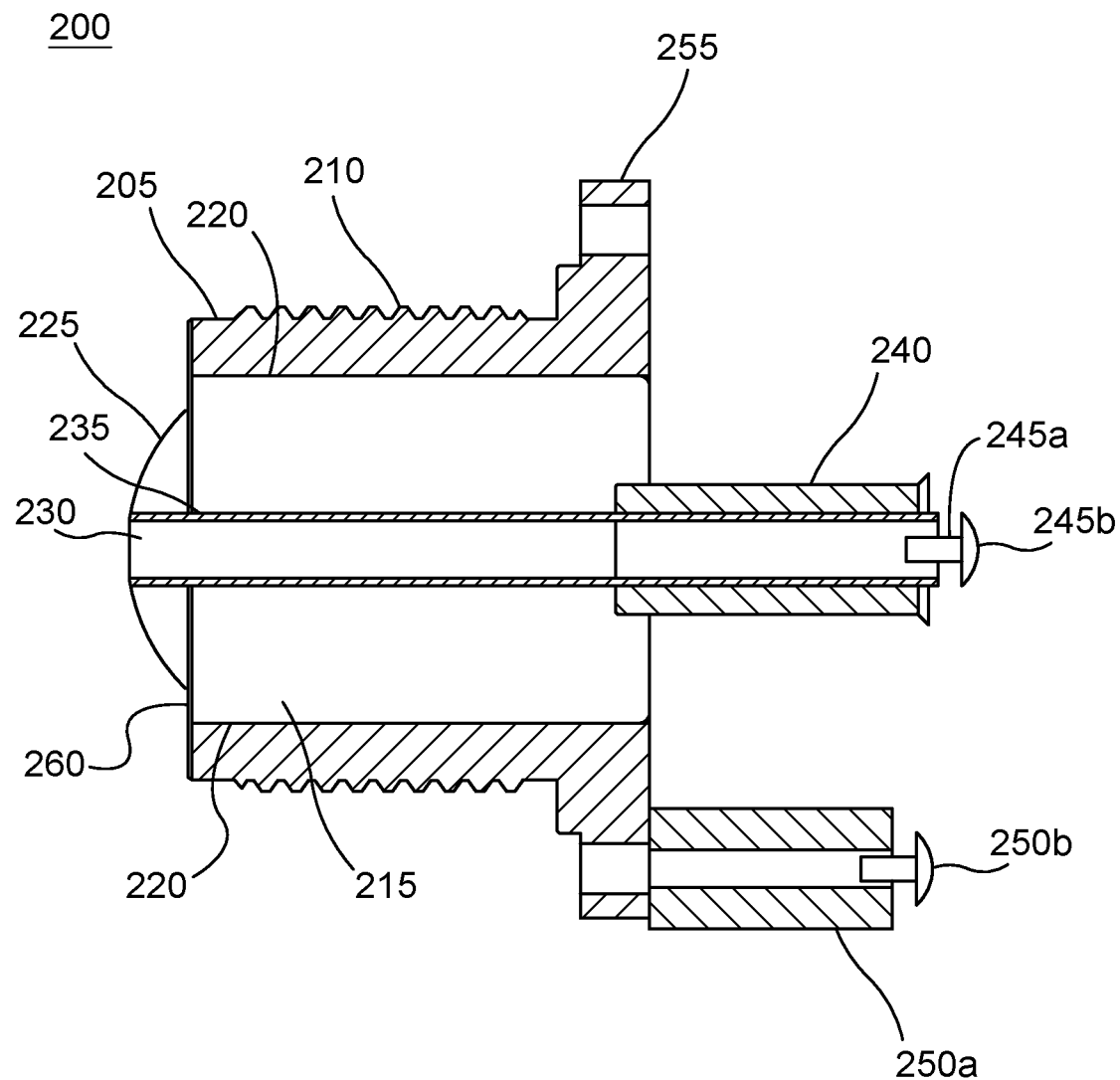
FIG. 2 illustrates a lengthwise cross sectional view of the emitter.

FIG. 2 illustrates a lengthwise cross sectional view of emitter 200, which is similar in implementation and description to emitter 100, shown in FIG. 1. Emitter 200 includes an emitter body 205. Emitter body 205 may be threaded with threads 210, as explained above. Emitter 200 further includes a void 215 which is defined by an internal wall 220 of emitter body 205. At least some portion of anode 225 may be disposed within void 215, without directly contacting internal wall 220 of emitter body 205.

Anode 225 may be connected to conductor rod 235 at connection point 230. In one embodiment, anode 225 may be connected to conductor rod 235 at connection point 230 by a solder connection, which may use, for example, silver solder to facilitate conduction of electricity between conductor rod 235 and anode 225. Anode 225 may be separated from emitter body 205 by gap 260, which will be discussed in further detail below. Conductor rod 240 may be disposed through a void in insulator 240 and connect to a power supply at connection point 245a which receives a screw connector 245b. Emitter 200 further includes a cathode 250a which is electrically connected to emitter body 205. Cathode 250a may also receive a screw connector 250b as a connection point for the power supply. It should be noted that a screw connector 245b and 250b are shown in FIG. 2 merely for representative purposes. Any electrical connector or connection suitable for energizing conductor rod 240 and emitter body 205 by cathode 250a known in the art would be sufficient.

Emitter body 205 may also include a wrenching surface 255, which is similar to wrenching surface 140, shown in FIG. 1. Wrenching surface 255 may be octagonally shaped, hexagonally shaped, square shaped, or shaped using any polygonal shape which provides a surface for a tool to thread emitter 200, via threads 210, into an emitter body.

Figure 3:
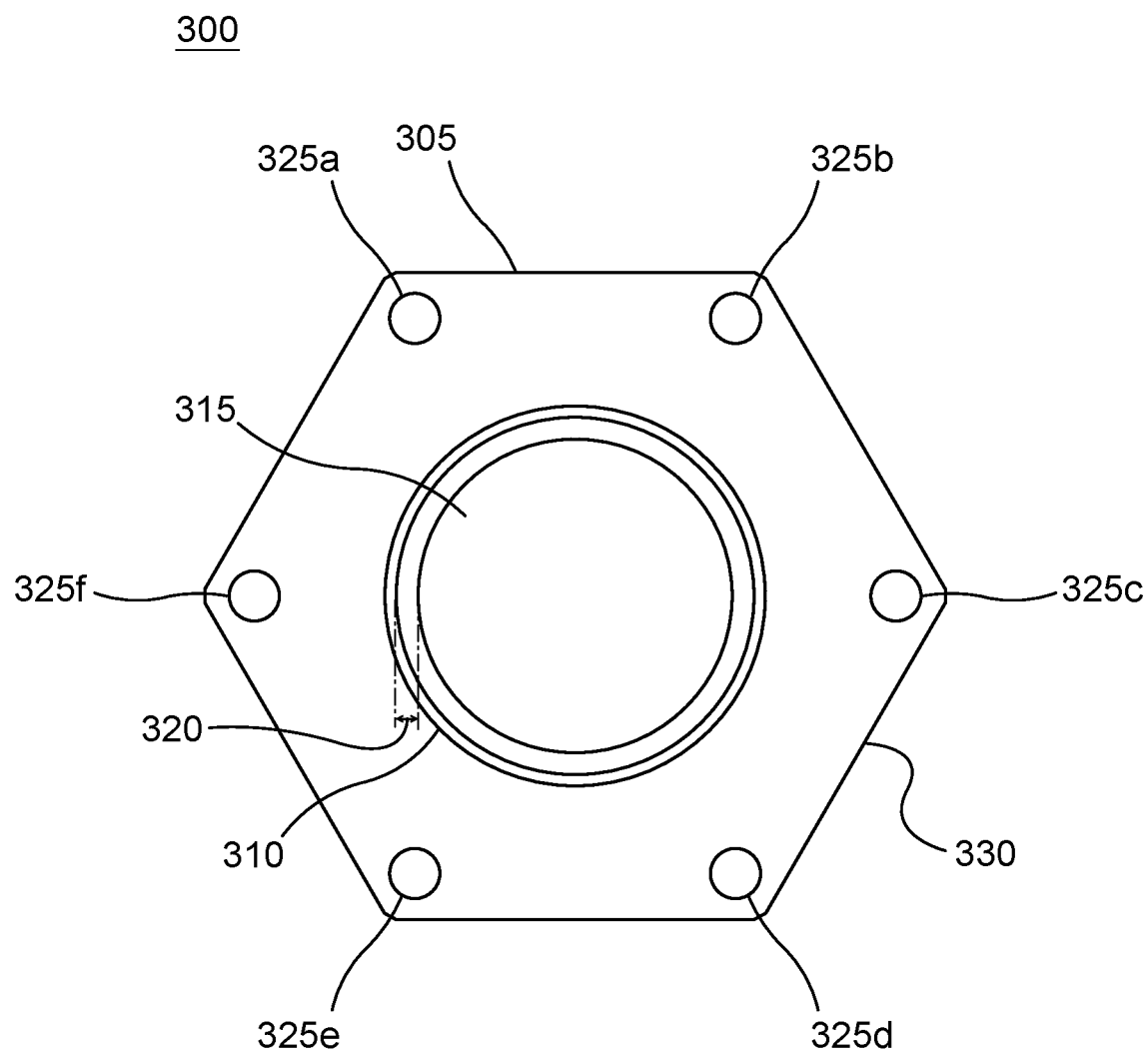
FIG. 3 illustrates a top-down view of the emitter.

FIG. 3 illustrates a top-down view of emitter 300, which is similar in description and implementation to emitter 100, shown in FIG. 1 and emitter 200, shown in FIG. 2. Emitter 300 includes an emitter body 305 which is similar in implementation and description to emitter body 105, shown in FIG. 1, and emitter body 205, shown in FIG. 2. Emitter body 305 may be threaded with threads 310, as explained above.

As shown in FIG. 3, emitter 300 includes an anode 315 which is separated from emitter body 305 by an annular gap 320. In one embodiment a hemispherical portion of anode 315 and the portion of emitter body 305 across annular gap 320 from anode 315 may be plated with a metal, metal alloy, ceramic, or polymer, etc. In one embodiment, a portion of emitter body 305 and anode 315 may be plated with palladium, rhodium, platinum, or other metal, metal alloy, polymer, or ceramic material. When properly energized by a power supply, emitter 300 generates a plasma field between anode 315 and emitter body 305 in annular gap 320.

Emitter 300 further includes a plurality of mounting holes 325a-325h which are positioned at each vertex of a wrenching surface 330. Wrenching surface 330 is similar to wrenching surface 140, shown in FIG. 1 and wrenching surface 255, shown in FIG. 2. Wrenching surface 330 is shown as being hexagonal but may be implemented in any polygonal shape that facilitates attachment by a tool, such as a wrench to thread emitter 300 into or out of an emitter body, which will be discussed below, via threads 310.

Figure 4:
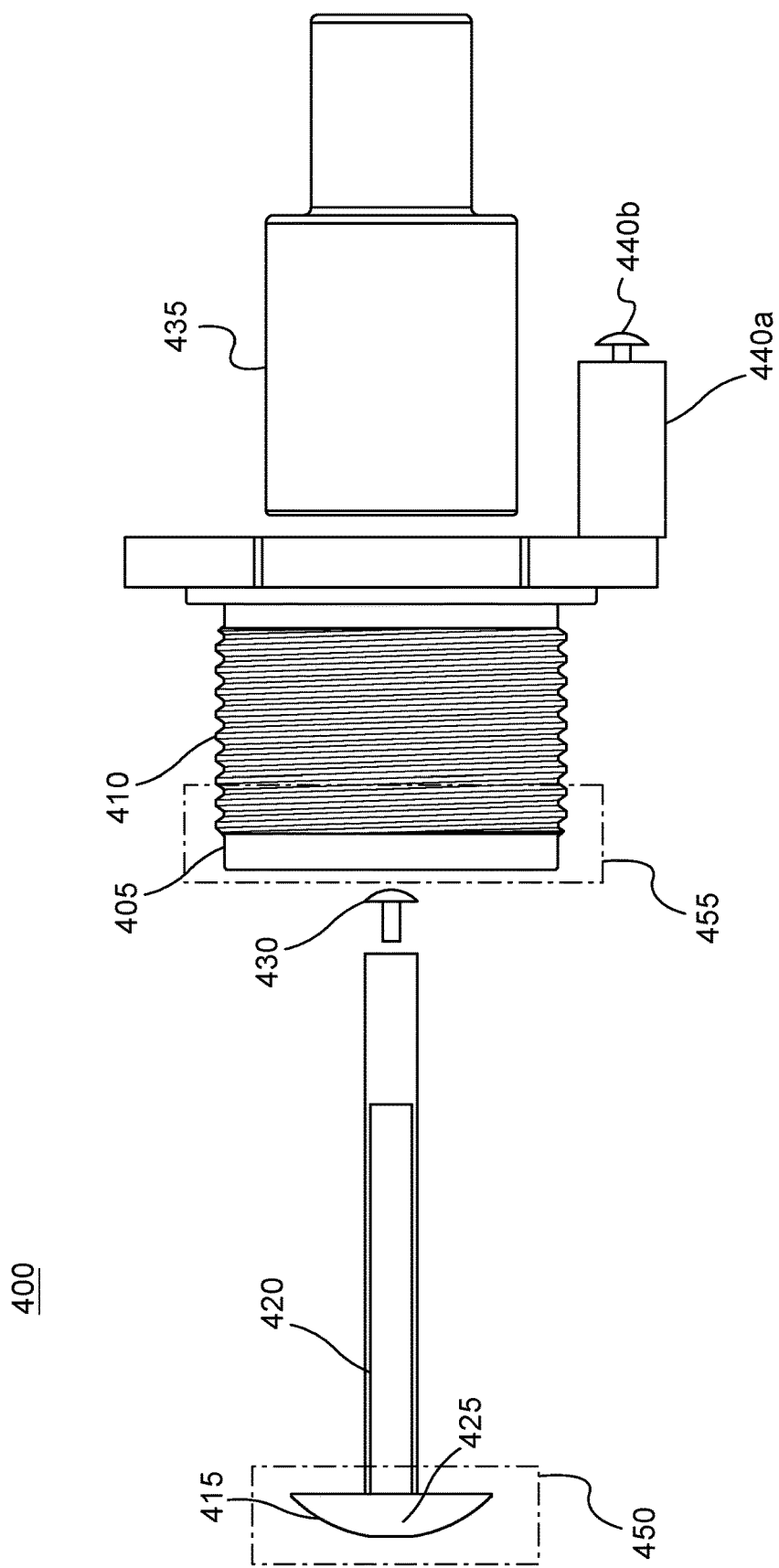
FIG. 4 illustrates an exploded side perspective view of the components of the emitter.

FIG. 4 illustrates an exploded side perspective view of the components of the emitter 400. Emitter 400 is similar in implementation and description to emitter 100, shown in FIG. 1, emitter 200, shown in FIG. 2, and emitter 300, shown in FIG. 3. Emitter 400 includes an emitter body 405 which is threaded with threads 410, as previously discussed. Emitter body includes an integrally formed cathode 440a, which also includes a screw connector 440b for attaching cathode 440a to a power supply.

Emitter 400 includes an anode 415 which is generally hemispherical in shape, as previously discussed. Anode 415 is connected to conductor rod 420, which may be soldered to anode 415 at connection point 425. In a preferable embodiment, connection point 425 is formed using silver solder between anode 415 and conductor rod 420. Conductor rod 420 may further include a connector 430 which allows anode 415 to be connected to a power supply.

Emitter 400 may be constructed by attaching insulator 435 into a corresponding recess within emitter body 405. Insulator 435 may be similar in implementation and description to insulator 120, shown in FIG. 1 and insulator 240, shown in FIG. 2. Once insulator 435 is installed within emitter body 405, conductor rod 420 may be inserted through emitter body 405 into a corresponding void in insulator 435 such that at least connector 430 of conductor rod 420 protrudes past insulator 435. Conductor rod 420 is appropriately sized such that at least some portion of the hemispherical emitter 415 protrudes, in a preferred embodiment, at least slightly above emitter body 405. Conductor rod 420 may be permanently or removably secured within insulator 435 using techniques known in the art.

Element 450 and element 455 illustrate portions of anode 415 and emitter body 405 which may be plated with a metal or metal alloy, such as palladium. In one embodiment, an outside, convex, surface of anode 415 may be plated with a metal or metal alloy, such as palladium, rhodium, platinum, conductive polymers, and conductive ceramics. In another embodiment, both an inside and outside surface of emitter body 405 may be plated with a metal or metal alloy, such as palladium, rhodium, platinum, conductive polymers, and conductive ceramics. Accordingly, a portion of emitter body 405 may be plated with the exemplary conductive materials discussed herein, such as palladium while a remaining portion of emitter body 405 is unplated. However, it is conceivable that the entirety of emitter body 405 may be plated, according to certain embodiments.

Figure 5:
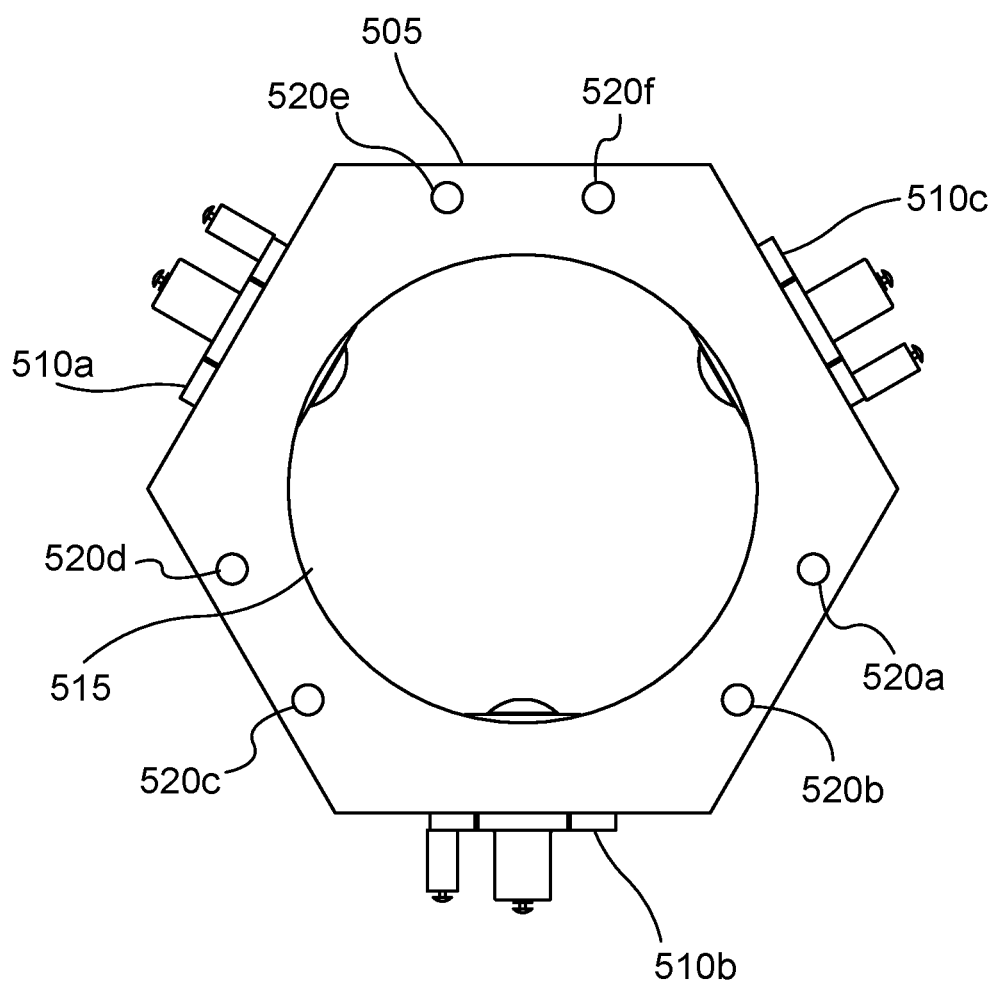
FIG. 5 illustrates an emitter manifold.

FIG. 5 illustrates an emitter manifold 500. Emitter manifold 500 includes a manifold body 505, which may be formed using plastic or metal materials. As shown in FIG. 5, manifold body 505 may be constructed in a hexagonal shape although other shapes may be implemented as desired, subject to proper alignment of emitters 510a-510c, as will be discussed below. For example, manifold body 505 may be implemented in a circular shape or any other polygonal shape, as may be suitable for a particular implementation. Manifold body 505 may include one or more ports 520a-520f for connecting manifold body 505 to an exhaust system.

Manifold body 505 may further include one or more emitters, such as emitter 510a, emitter 510b, and emitter 510c. In one embodiment, three emitters are included within manifold body 505. Preferably, each emitter is spaced from the other emitters at substantially 120° (within approximately 5°). Further, each emitter may be "tuned" to produce a non-linear quantum dissonance chamber 515 within manifold body 505. For example, each emitter may be connected singly to an individual power source or may be commonly connected to one power source, or a plurality of power sources.

Each emitter may be supplied with a particular voltage of electricity, a particular amperage of electricity, at a particular frequency, at a particular phasing, at a particular amplitude, and for a particular duration, which is unique to each individual emitter. For example, each emitter may be supplied with 13.5 volts of direct current electricity at between 60-120 amps and output 150,000 volts of direct current electricity at 5.5 milliamps. One emitter may output a plasma field at 1.3 megahertz while a second output frequency for a second emitter may be a perfect $5^{th}$ harmonic above the primary frequency and while a third output frequency for a third emitter may be a perfect minor $2^{nd}$ below the primary frequency. Other variables such as phasing and duration may be adjusted to suit a particular implementation.

When each emitter is properly powered, a non-linear quantum dissonance condition is created within non-linear quantum dissonance chamber 515 which allows molecules within non-linear quantum dissonance chamber 515 to be dissociated into their constituent elements. For example, a molecule of carbon dioxide may be dissociated into an atom of carbon and two atoms of oxygen. Similarly, a molecule of nitrogen oxide may be dissociated into an atom of nitrogen and an atom of oxygen. Tests have shown emitter manifold 500 is capable of dissociating any gaseous molecule.

Figure 6:
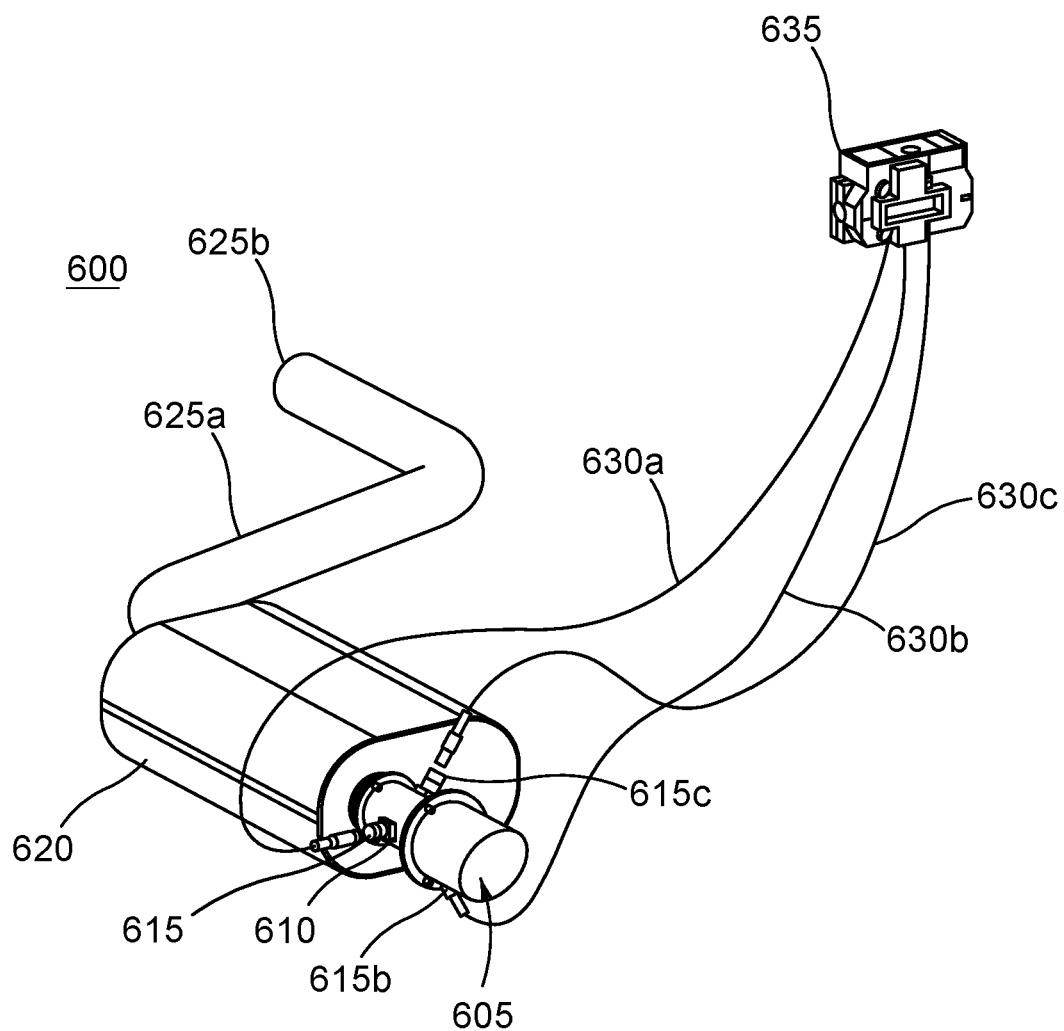
FIG. 6 illustrates an exemplary exhaust system implementing the emitter manifold.

FIG. 6 illustrates an exemplary exhaust system 600 implementing an emitter manifold 610, which is similar to emitter manifold 500, shown in FIG. 5. Exhaust system 600 includes an exhaust source 605 which is emitted directly into emitter manifold 610. Exhaust source 605, as shown in this example, is from an internal combustion engine in a vehicle, such as a light truck or car. However, the use of emitter manifold 610 is not limited in application to vehicles. Emitter manifold 610 may be used in any exhaust environment (which includes unburned exhausts generated by pressure built up by volatile and non-volatile organic or inorganic compounds, such as might exist within various storage tanks).

Emitter manifold 610 may include emitters 615a, 615b, and 615c which are implemented as shown and described with respect to FIG. 5, above. Emitter manifold 610 may be connected to a muffler 620, an exhaust pipe 625a and a tail pipe 625b. Emitter 615a may receive power via wire 630a from power supply 635. Similarly, emitter 615b may receive power via wire 630b from power supply 635. Emitter 615c may also receive power via wire 630c from power supply 635. As shown in FIG. 6, power supply 635 is represented as a single power supply, providing power to each emitter. However, it is again noted that multiple power supplies may be implemented and each emitter may be powered by a power supply dedicated singly to that emitter.

Exhaust system 600 allows exhaust to flow into emitter manifold 610 which efficiently dissociates molecules in the exhaust flow, using the techniques described herein and allows the elemental components of the gas to flow into muffler 620. Muffler 620, as is known in the art, reduces the noise generated by an engine. The elemental components of the exhaust may then flow from muffler 620 into exhaust pipe 625a and out tail pipe 625b. It is believed that the elemental components, when exhausted, will have a drastically less undesirable and harmful effect on the Earth's atmosphere.

The foregoing description is presented for purposes of illustration. It is not exhaustive and does not limit the invention to the precise forms or embodiments disclosed. Modifications and adaptations are apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. An emitter, comprising:
    a palladium plated anode, including an electrode which is arcuate in three dimensions and a conductor rod connected to the electrode; and
    a cathode, at least a portion of which is palladium plated, wherein the anode is disposed within a void of the cathode.
2. The emitter of claim 1, wherein the anode is insulated from the cathode by an insulator.
3. The emitter of claim 1, wherein the anode protrudes through the insulator.
4. The emitter of claim 1, wherein the conductor rod is connected to the electrode by silver solder.
5. The emitter of claim 1, wherein an annular gap separates the palladium plated anode from the portion of the cathode which is palladium plated.
6. The emitter of claim 1, wherein the cathode is an emitter body.
7. The emitter of claim 6, wherein a cathode connector is integrally formed in the emitter body.
8. The emitter of claim 6, wherein the emitter body includes a wrenching surface.
9. The emitter of claim 6, wherein the emitter body is threaded.
10. A device, comprising:
    one or more emitters, each comprising:
        a palladium plated anode; and
        a cathode, at least a portion of which is palladium plated
    wherein the one or more emitters are disposed within an emitter manifold.
11. The device of claim 10, wherein the emitters are disposed around the emitter manifold at substantially 120° from any other emitter.
12. The device of claim 10, wherein the emitter manifold is hexagonally shaped.
13. The device of claim 10, wherein the emitter manifold includes a non-linear quantum dissonance chamber.
14. The device of claim 10, wherein, each of the one or more emitters is threaded into the emitter manifold.
15. The device of claim 10, wherein each of the one or more emitters receives power from a dedicated power supply for each of the one or more emitters.
16. The device of claim 10, wherein the one or more emitters receive power from a power supply.
17. The device of claim 13, wherein the non-linear quantum dissonance chamber is circularly shaped.

* * * * *